(12) United States Patent
Zink et al.

(10) Patent No.: US 8,863,775 B2
(45) Date of Patent: Oct. 21, 2014

(54) HIGH PRESSURE FLUID SPRAY NOZZLE INCORPORATING A FLOW CONTROLLED SWITCHING VALVE

(75) Inventors: Gerald P. Zink, Durango, CO (US); Neil C. O'Connor, Hesperus, CO (US)

(73) Assignee: Stonage, Inc., Durango, CO (US)

( * ) Notice: Subject to any disclaimer, the term of this patent is extended or adjusted under 35 U.S.C. 154(b) by 413 days.

(21) Appl. No.: 13/367,080

(22) Filed: Feb. 6, 2012

(65) Prior Publication Data

US 2012/0205405 A1 Aug. 16, 2012

Related U.S. Application Data

(63) Continuation-in-part of application No. 13/027,091, filed on Feb. 14, 2011, now Pat. No. 8,667,987.

(51) Int. Cl.
| | |
|---|---|
| *F16K 31/12* | (2006.01) |
| *B05B 3/04* | (2006.01) |
| *B05B 3/06* | (2006.01) |
| *B05B 1/16* | (2006.01) |
| *B08B 9/049* | (2006.01) |
| *E03F 9/00* | (2006.01) |

(52) U.S. Cl.
CPC ............. *B08B 9/0497* (2013.01); *B05B 3/0463* (2013.01); *E03F 9/00* (2013.01); *B05B 3/06* (2013.01); *B05B 1/1681* (2013.01)
USPC .... 137/624.27; 137/872; 137/874; 239/581.2

(58) Field of Classification Search
USPC ............ 137/624.27, 238, 240, 246, 872, 874; 222/566; 239/581.1, 581.2
See application file for complete search history.

(56) References Cited

U.S. PATENT DOCUMENTS

| | | | |
|---|---|---|---|
| 3,707,168 A | 12/1972 | Boelkins | |
| 3,774,634 A | 11/1973 | Bonney | |
| 4,615,482 A | 10/1986 | Marusiak et al. | |
| 4,744,285 A | 5/1988 | Presley | |
| 4,921,002 A * | 5/1990 | Christon et al. | ......... 137/624.18 |
| 4,934,402 A | 6/1990 | Tarnay et al. | |
| 6,059,202 A * | 5/2000 | Zink et al. | ..................... 239/259 |
| 6,237,622 B1 | 5/2001 | Cook et al. | |

(Continued)

OTHER PUBLICATIONS

International Search Report and Written Opinion, dated Aug. 14, 2012, from corresponding International Application No. PCT/US2012/024001.

(Continued)

*Primary Examiner* — Kevin Lee
(74) *Attorney, Agent, or Firm* — Greenberg Traurig, LLP

(57) ABSTRACT

A flow path switching valve is disclosed that can be operated remotely simply by turning flow on and off. The switching valve may be incorporated into the body of a high pressure nozzle. In one embodiment a mid portion of the valve body has at least one passage therein leading from a central axial bore to first and second external ports. A poppet member received in the central axial bore directs fluid flow in a first position to the first external ports. The poppet member, when in a second position, closes the central axial bore through the outlet end of the valve body and permits fluid flow through the second set of external ports. Selection of the different flow paths is made by simply reducing flow through the valve below a predetermined fluid flow threshold and then increasing the flow rate above the threshold.

20 Claims, 16 Drawing Sheets

(56) References Cited

U.S. PATENT DOCUMENTS

| | | |
|---|---|---|
| 6,279,594 B1 | 8/2001 | Beitzel et al. |
| 6,478,041 B1 * | 11/2002 | Stede .......................... 137/240 |
| 7,802,588 B2 | 9/2010 | Doutt |
| 8,667,987 B2 * | 3/2014 | Zink ....................... 137/624.27 |
| 2002/0092566 A1 | 7/2002 | Rhone et al. |
| 2007/0199601 A1 | 8/2007 | Imhof |

OTHER PUBLICATIONS

Examination/Search Report dated May 9, 2014, from corresponding Singapore Application No. 201305622-1.

* cited by examiner

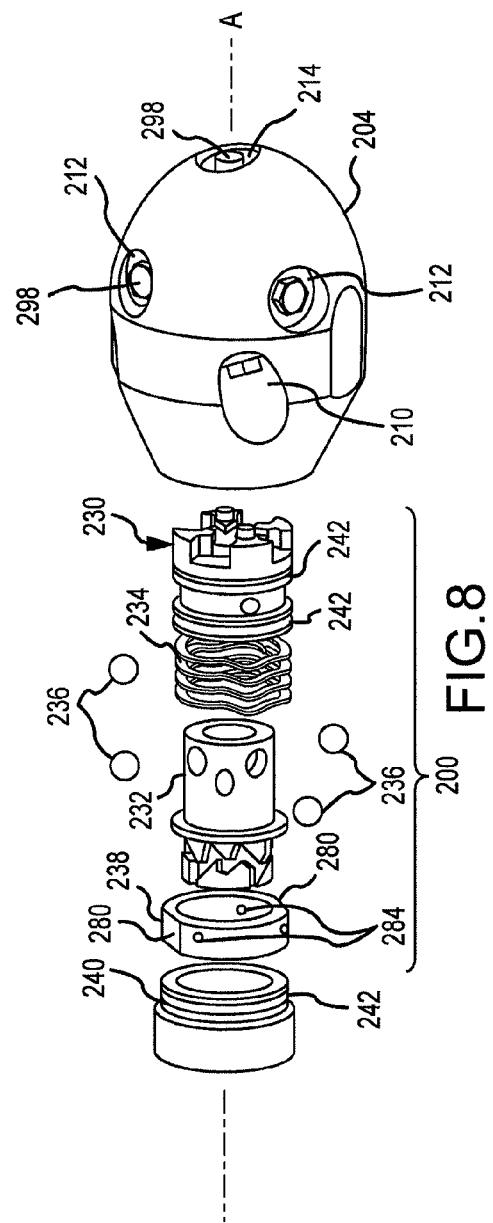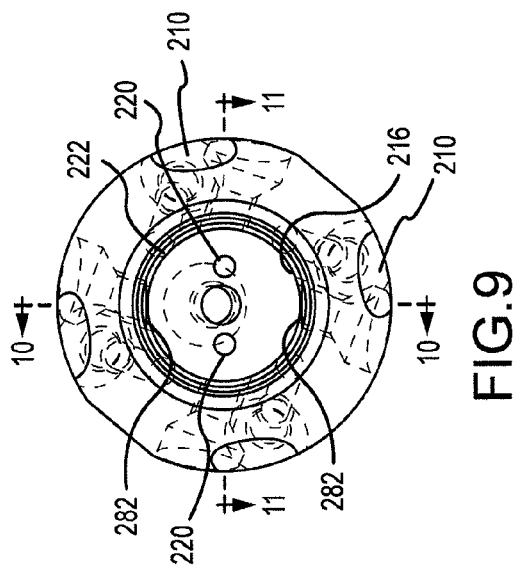
FIG. 8
FIG. 9

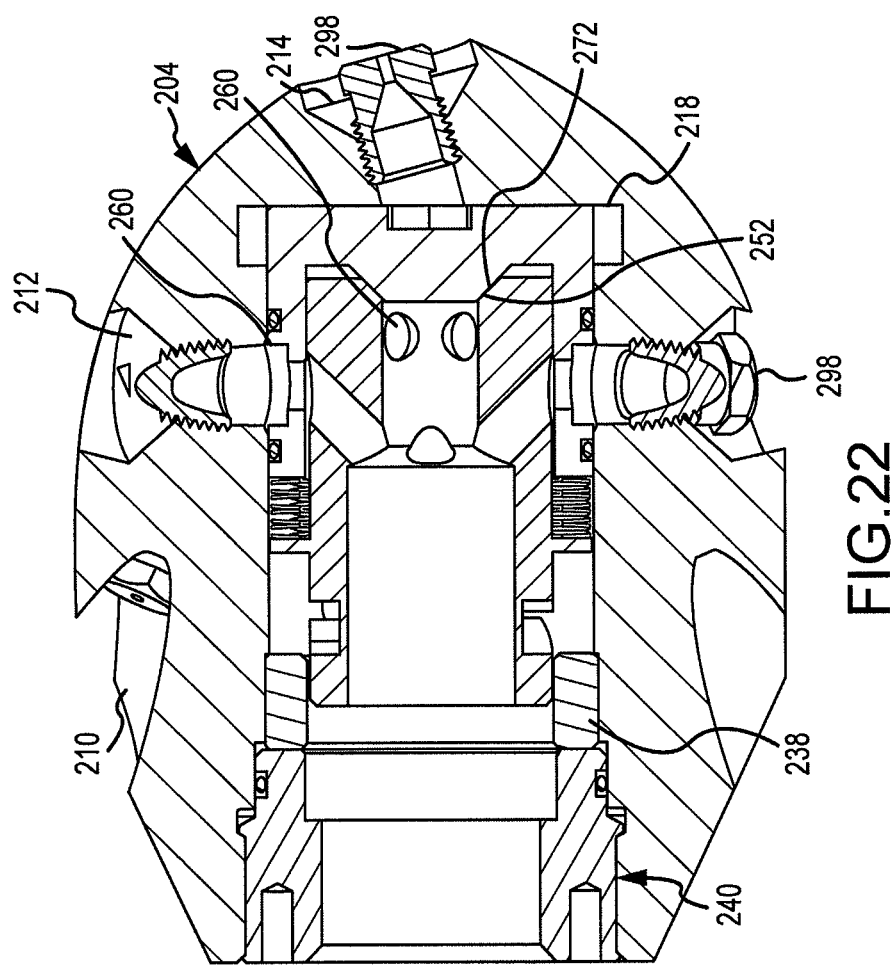

HIGH PRESSURE FLUID SPRAY NOZZLE INCORPORATING A FLOW CONTROLLED SWITCHING VALVE

CROSS REFERENCE TO RELATED APPLICATIONS

This application is a continuation in part of U.S. patent application Ser. No. 13/027,091, filed Feb. 14, 2011 now U.S. Pat. No. 8,667,987, entitled Controlled Switching Valve, the content of which is hereby incorporated by reference in its entirety.

BACKGROUND OF THE DISCLOSURE

Traction nozzles are used in sewer pipe lines and other piping systems to assist in pulling high pressure hose into the pipe to reach obstructions requiring removal. These traction nozzles have jet tips oriented at an angle rearward in order to generate thrust in the nozzle within the pipe to assist in pulling the hose through and along long stretches of pipe and around pipe bends. These nozzles have forward directed jet tips to ablate the obstructions encountered. However, the forward directed jet tips produce a counter force against forward travel of the nozzle through the pipe. This counterforce hinders effective deployment of the high pressure hose and reduces the net pulling force produced by the traction nozzle on the high pressure hose. Thus there is a need for a switching mechanism that does not generate a counterforce during traction operation, yet facilitates operation of an effective fluid jet nozzle during actual cleaning operations.

SUMMARY OF THE DISCLOSURE

The present disclosure directly addresses this problem. A switching valve in accordance with a first embodiment in the present disclosure provides a simple valve device that switches, or redirects fluid flow between a first flow path such as to rearwardly directed nozzle jets and a second flow path, such as to forwardly directed cleaning jets, remotely. This is accomplished simply by decreasing fluid flow through the valve below a predetermined threshold level and then increasing fluid flow above the threshold level. The valve can provide full pressure and fluid flow to each of the flow paths separately.

A valve in accordance with the present disclosure essentially has at least two operative positions, analogous to operation of a retractable ball point pen. One exemplary use of the valve is in sewer pipe cleaning with water jet nozzles. In such a configuration the valve in accordance with the present disclosure is installed between a cleaning nozzle assembly and a high pressure fluid hose sized to be inserted into a sewer or other piping system.

The valve preferably includes a plurality of tractor nozzles arranged to provide maximum pulling force to advance the hose, to which the valve is connected, through the sewer piping system to a distant area needing cleaning. When the cleaning nozzle, attached to the front end of the valve, arrives at the area needing cleaning, a temporary flow interruption by the operator causes the valve to automatically switch from a first position directing fluid flow to the rearwardly directed tractor nozzles to an intermediate position. The valve automatically switches from the intermediate position to a second position directing fluid flow to the forwardly directed cleaning nozzle or nozzles when flow is restored. Another flow interruption causes the valve to reposition again to an intermediate position. Restoration of fluid flow above the threshold again switches the valve back to the first position directing fluid flow to the rearwardly directed tractor nozzles. A further flow interruption causes the valve to return to the intermediate position. Restoration of fluid flow above the threshold causes the valve to again switch to the second position as above described. Thus each time the flow is interrupted and then restored causes the valve to switch positions and hence flow paths.

One exemplary embodiment of the flow actuated flow path switching valve includes a hollow valve body having an inlet end, an outlet end, a mid portion, and a central axial bore through the inlet end, the mid portion, and the outlet end. The mid portion has at least one passage therein leading from the central axial bore through the valve body to at least one external port having a tractor nozzle mounted therein. An elongated poppet member is received, or carried, in the central axial bore of the valve body.

The poppet member has an open tubular rear end portion, a spool portion and a closed valve disc end portion. The poppet member can move axially back and forth in the central axial bore. The poppet member has an axial bore extending through the rear portion and at least part of the spool portion of the poppet member. The spool portion has one or more radial arms extending outward to abut against the mid portion of the valve body. The valve disc portion selectively closes the central axial bore through the outlet end of the valve body when contact is made with a seat formed in the outlet end of the valve body.

A biasing member such as a spring is preferably positioned between the valve body and the poppet member such that it resiliently biases the poppet member toward the inlet end of the valve body. The spring is held and compressed between a flange around the rear end portion of the poppet member and a shoulder in the central axial bore through the valve body. Fluid pressure and flow exerted on the rear end portion of the poppet member compresses the spring to move the poppet member forward, away from the inlet end of the valve body. Reduction of fluid pressure/flow below a threshold permits the spring to push the poppet member rearward.

The valve further includes a guide in the valve body that engages a corresponding feature on the rear end portion of the poppet member to change orientation of the poppet member each time fluid flow through the valve drops below a threshold value. Specifically, at a first position of the poppet member, this guide and corresponding feature cooperate to align the radial arm on the spool portion with the at least one passage in the mid portion of the valve body and open the central axial bore through the outlet end of the valve body when fluid flow is introduced into the inlet end of the valve body at the first position.

This guide also causes the poppet to rotate and misalign the radial passage in the spool portion away from the at least one passage in the mid portion of the valve body when fluid flow is reduced below the predetermined flow rate threshold, to an intermediate position. The guide is configured to align the arm of the spool portion at a second position different from the first position, also closing the central axial bore through the outlet end, when fluid flow is next introduced in the inlet end of the valve body above the flow rate threshold. In this second position, fluid flowing around the arm of the spool portion enters and passes through the at least one passage in the mid portion of the valve body.

One exemplary embodiment of the valve has four radial arms on the spool portion of the poppet and four passages through the mid portion of the valve body leading to four rearwardly directed tractor nozzles. These tractor nozzles exit the valve body at a rearward angle. The reaction force of the fluid jet exiting these nozzles pulls the valve and the hose connected thereto into the piping system. Fluid flows through these nozzles when the valve is in the second position. When an obstruction is reached in the piping system, the operator simply turns off the flow, thus reducing flow below the threshold and the valve poppet moves rearward to an intermediate, or mid, position.

When flow is again restored by the operator turning flow back on, the poppet moves forward, rotating via the guide, to the first position. In the first position, the radial arms are aligned with the passages through the mid portion of the valve body, thus closing the passages. At the same time, the poppet is prevented from closing the outlet portion, thus permitting fluid flow past the poppet and out the outlet end of the valve to the cleaning nozzle attached to the front end of the switching valve.

In a preferred embodiment, the poppet spool portion has a central bore and a passage leading from the central bore through each of the radial arms. In each passage through the radial arm is a stopper ball which, due to fluid pressure, completely plugs the passage through the mid portion of the valve body such that no fluid can flow to the tractor nozzles. These stopper balls ensure complete stoppage of fluid flow through the tractor nozzles when flow is being directed through the valve outlet to the cleaning nozzle.

Another embodiment is a nozzle configuration that incorporates a flow controlled switching valve in accordance with the present disclosure operationally similar to the one as described above directly into the nozzle head itself. The hollow nozzle head has a central blind bore that carries within it an entire switching valve cartridge. This switching valve cartridge in the blind bore includes a valve cartridge case into which the valve poppet slides, a spring around a stem portion of the poppet, and a poppet guide pin ring. The cartridge comprising the guide pin ring, the poppet, spring and cartridge case are captured in the blind bore in the nozzle head by a threaded inlet bushing. The inlet bushing is in turn fastened to the shaft of a rotary bearing coupling, which is, in turn, attached to a distal end of a high pressure fluid supply hose.

One exemplary nozzle includes a hollow body having a central bore and a plurality of ports extending through the body from the central bore; and a switching valve cartridge disposed in the central bore. The cartridge is operable to direct fluid flow from its inlet to at least one of the plurality of ports upon application of fluid flow above a predetermined threshold into the inlet and direct fluid flow from the inlet to at least a different one of the plurality of ports upon fluid flow having subsequently dropped below the predetermined threshold and then re-established to a level exceeding the predetermined threshold. The axially movable poppet is located at a first position in the case when fluid flow is directed through the at least one of the plurality of ports and is located at a second position when fluid flow is directed through the at least one different port. The poppet is moved via the spring to a third axial position whenever fluid flow drops below the predetermined threshold. More preferably, the poppet at the first position directs fluid flow through a first set of ports and directs fluid flow through a second set of ports at the second position. Each transition below the predetermined threshold causes the fluid flow to alternate between the first and second set of ports.

The nozzle head in accordance with this alternative embodiment preferably has at least two axially spaced sets of nozzle ports passing from the central blind bore to the peripheral surface of the nozzle head. One set of nozzle ports is aligned via the cartridge within the central blind bore when fluid pressure is applied to the nozzle head setting the poppet in a first operating position within the cartridge. A second set of nozzle ports is aligned via the cartridge when fluid pressure is stopped and then reapplied to the nozzle head. The next fluid pressure stoppage and reapplication then realigns the poppet to a next set of nozzle ports. With two sets of nozzle ports, each cycle of stopping fluid pressure and reapplication of fluid pressure changes the set of nozzle ports through which fluid can pass.

More particularly, one exemplary valve cartridge includes a generally tubular valve cartridge case. This case has an inlet end, an outlet end, a mid portion, and a central axial bore through the inlet end and at least the mid portion. The mid portion has at least one first opening leading from the central axial bore out through the mid portion of the cartridge case. The outlet end has at least one second opening leading from the central axial bore out through the end portion of the cartridge case.

A generally tubular valve poppet having a central passage therethrough is movably disposed axially in the central axial bore of the cartridge case. This poppet has an open tubular rear end portion, a central portion and a front end portion. The central portion of the poppet has an external peripheral annular flange between the rear end portion and the central portion. The central portion has at least a first passage leading out of the poppet through a side wall and at least a second passage spaced from the first passage leading out of the poppet through the side wall of the poppet.

A biasing member, preferably a coil or Bellville spring, is positioned around the central portion between the valve cartridge case and the flange. The spring biases the poppet member axially away from the inlet end of the cartridge case.

A stationary guide member is positioned around the tubular rear end portion of the poppet. This guide member is fastened in the central bore to the hollow nozzle body at a fixed distance from the cartridge case. The guide member engages a corresponding feature on the rear end portion of the poppet to align the first passage of the central portion of the poppet with the at least one opening of the cartridge at a first position of the poppet when fluid flow is introduced into the rear end of the poppet, misalign the first passage with the at least one opening when fluid flow is reduced below a predetermined flow rate threshold, and align the second passage of the central portion of the poppet with the other opening in the valve cartridge case when fluid flow is next introduced in the inlet end of the poppet above the flow rate threshold.

Further features, advantages and characteristics of the embodiments of this disclosure will be apparent from reading the following detailed description when taken in conjunction with the drawing figures.

DESCRIPTION OF THE DRAWINGS

FIG. 8 is an enlarged exploded view of the switching nozzle head assembly shown in FIG. 7.

FIG. 9 is a separate rear end axial view of the nozzle head in accordance with the present disclosure.

FIG. 21 is an axial cross sectional view of the complete nozzle assembly shown in FIG. 20 in accordance with the present disclosure when fluid pressure is first applied on.

FIG. 22 is an axial cross sectional view of the complete nozzle assembly shown in FIG. 21 in accordance with the present disclosure when fluid pressure is next applied after being shut off.

DETAILED DESCRIPTION

Figure 1:
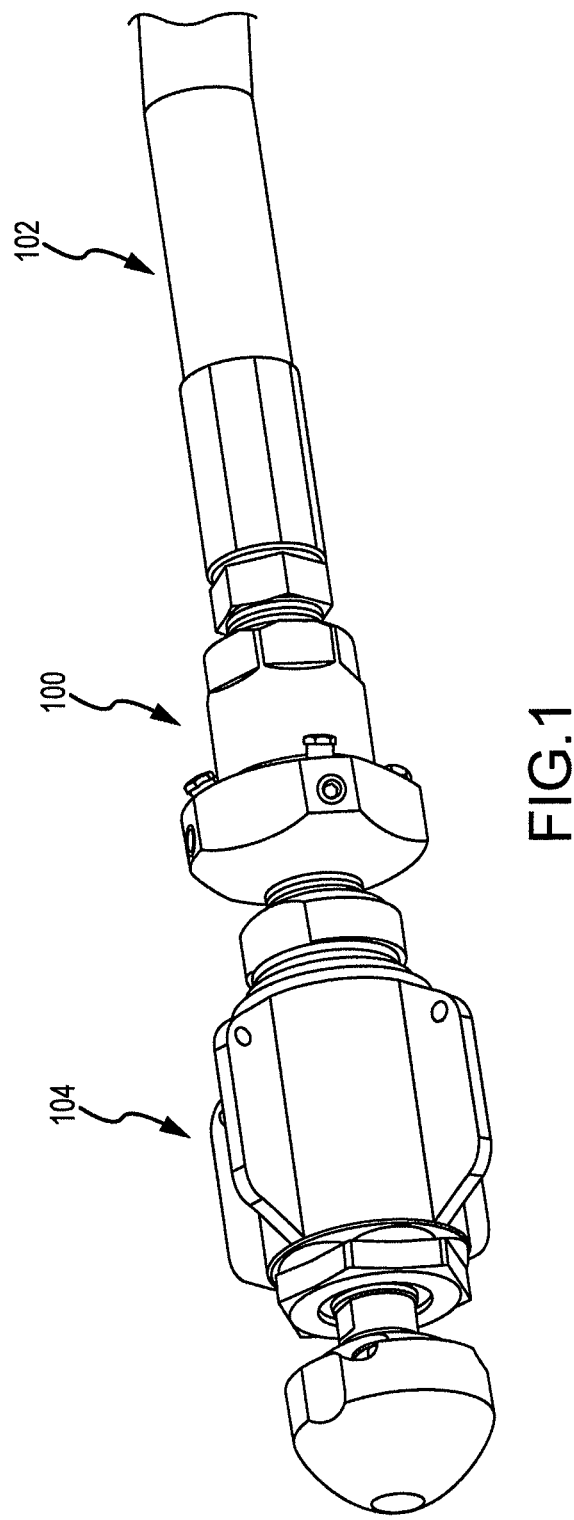
FIG. 1 is an external perspective view of one exemplary embodiment of a switching valve in accordance with this disclosure connected between a fluid hose and a cleaning nozzle.
Figure 2:
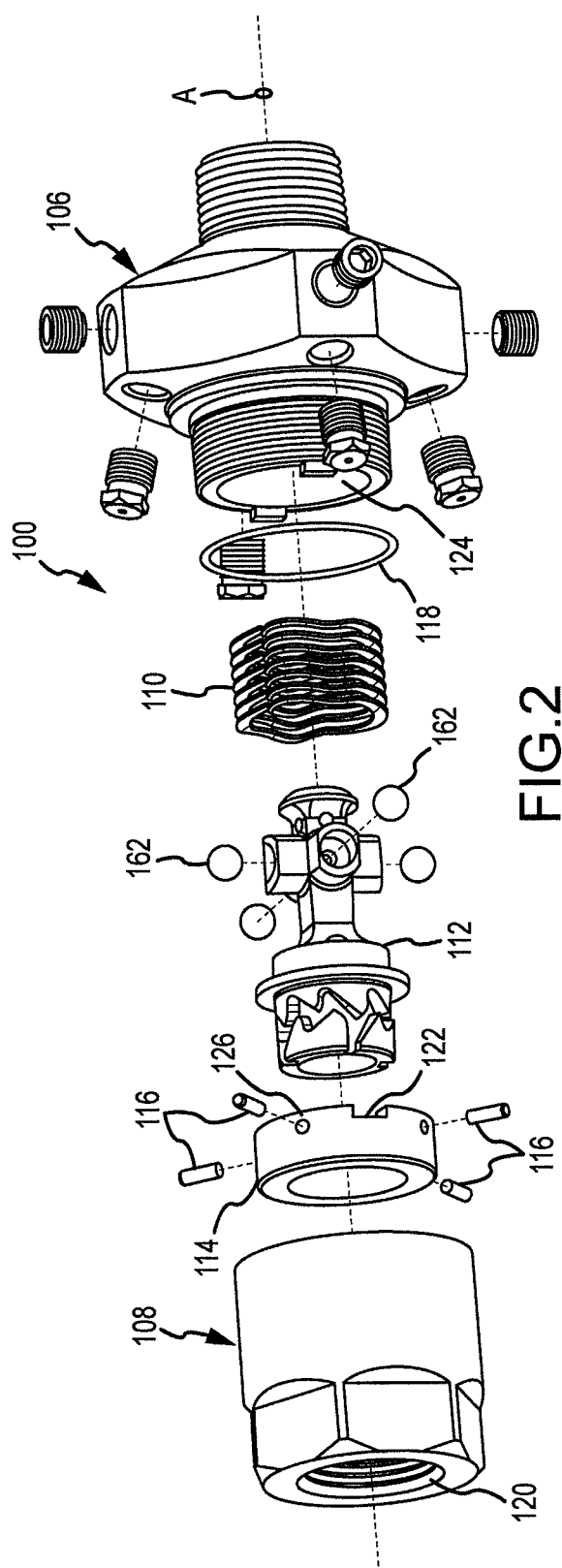
FIG. 2 is a separate exploded perspective view of the switching valve shown in FIG. 1.

An exemplary embodiment of a switching valve 100 is shown in FIG. 1 connected to a high pressure fluid hose 102 and to a cleaning nozzle 104. The switching valve 100 essentially has a generally cylindrical compact outer shape so that it can be inserted into pipes and other tubular passages. A separate exploded perspective view of the valve 100 is shown in FIG. 2. As shown in FIG. 2, the valve 100 includes a hollow main valve body 106 and an inlet end guide cap 108. Inserted into the main valve body 106 is a spring 110 and a poppet member 112. Inserted into the inlet end guide cap 108 is a guide collar 114 which carries four equally spaced guide pins 116. The inlet end guide cap 108 is sealed with an O-ring 118 and threaded onto the valve body 106, thus capturing together the poppet member 112, spring 110, guide collar 114 with guide pins 116.

The inlet end cap 108, at its rear, may have internal threads 120 as shown or alternatively may have external threads to mate with corresponding high pressure hose thread connections. The forward portion of the inlet end cap 108 has a recess to receive the guide collar 114 and has internal threads so as to be screwed onto the rear portion of the main valve body 106.

The guide collar 114 is a tubular sleeve that has a pair of alignment notches 122 which engage corresponding projections 124 on the rear portion of the main valve body 106. The engaged projections 124 prevent rotation of the collar 114 when assembled in the inlet end cap 108. The guide collar 114 also has four radial bores 126 therethrough each receiving a guide pin 116 press fit therein. When the guide collar 114 is assembled into the end cap 108, a portion of each of the guide pins 116 projects radially inward toward the axial centerline of the end cap 108.

Figure 3:
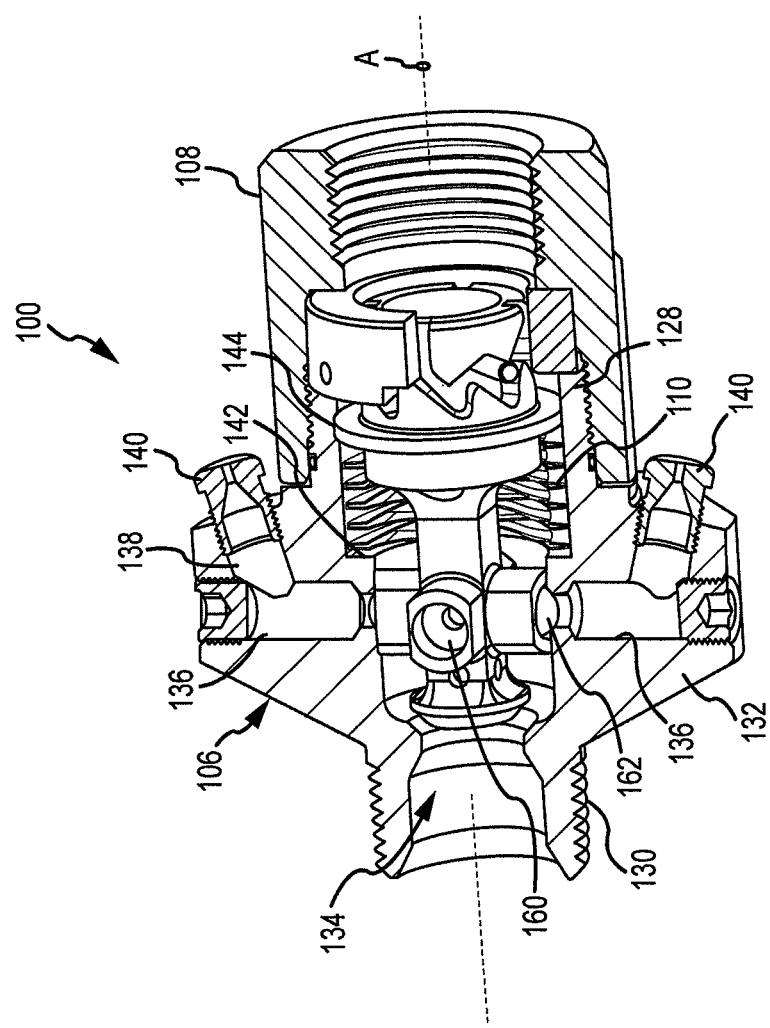
FIG. 3 is a longitudinal cross sectional view of the assembled switching valve body shown in FIG. 1 in accordance with the present disclosure, with the poppet and guide shown in perspective, in the first position.
Figure 4:
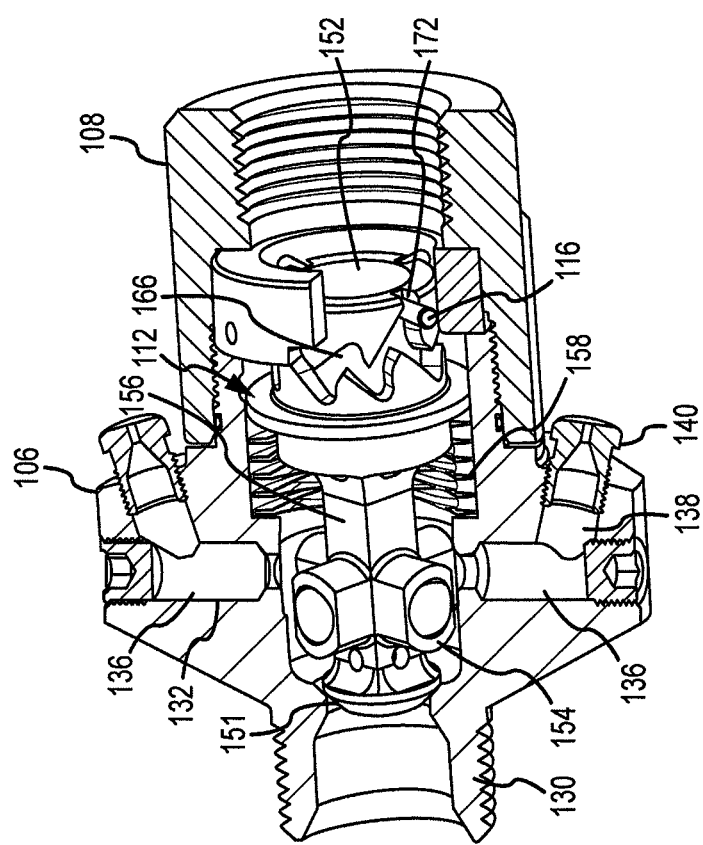
FIG. 4 is a view as in FIG. 3 with the poppet in the second position.
Figure 5:
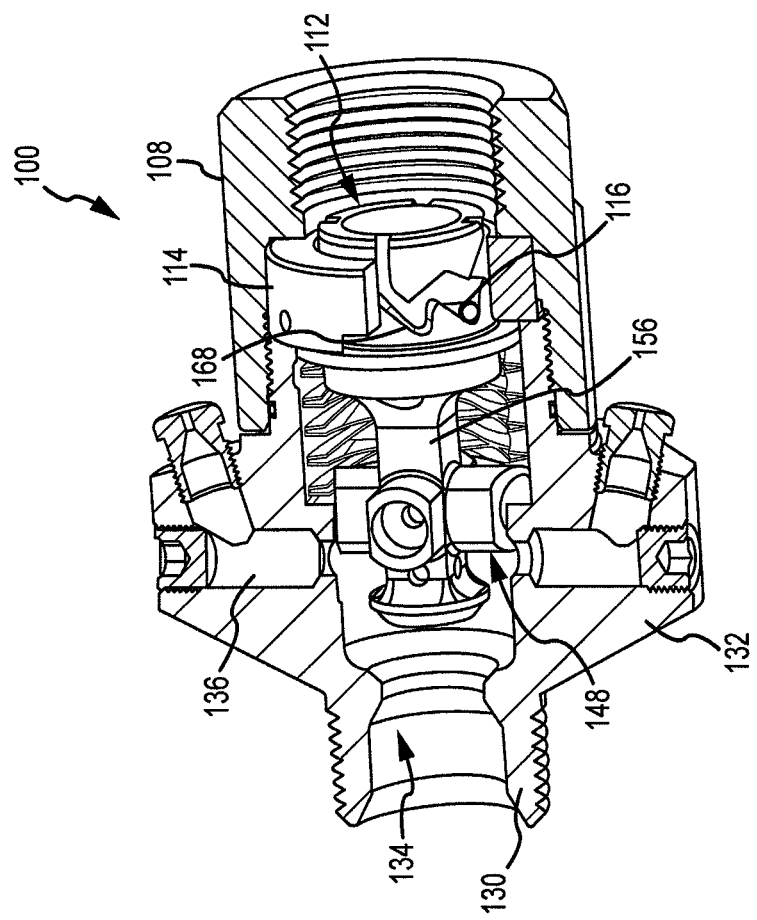
FIG. 5 is a view as in FIG. 3 with the poppet in the mid, or low flow, position.

The main valve body 106 is shown in cross section in FIGS. 3, 4 and 5. The valve body 106 is generally symmetrical about a central axis A. The valve body 106 has a an inlet end 128, an outlet end 130, a mid portion 132, and a central axial bore 134 through the inlet end 128, the mid portion 132, and the outlet end 130. The mid portion 132 has an enlarged flange external shape and has at least one passage 136 therein leading from the central axial bore 134 through the valve body 106 to at least one external port 138. In the exemplary embodiment of the valve 100 shown, there are four passages 136, equally spaced radially apart by 90°, leading to four external ports 138. Threaded into each external port 138 is a nozzle jet tip 140. Each of the external ports 138 is rearwardly directed at an angle such that forward thrust is exerted on the valve 100 when high pressure fluid is ejected through the nozzle jet tips 140 to push the valve, attached hose 102, and cleaning nozzle 104 through piping to the location needing to be cleaned. Note that, in the exemplary embodiment shown, there are four passages 136. Other valve body configurations are also envisioned, such as a valve body having any number of radial passages in the mid portion 132 of the valve body 106 leading to a corresponding number of ports 138, each having an appropriate nozzle jet tip 140 attached thereto.

The bias member 110 is a spring, such as a coil spring, and more preferably a flat wire wave compression spring that is captured between an internal shoulder 142 in the mid portion 132 of the valve body 106 and an annular flange 144 on the poppet member 112. This spring bias member 110 urges the poppet member 112 rearward toward the inlet end of the valve 100 in the absence of fluid pressure and flow. When fluid flow is introduced into the valve 100, the spring bias member 110 is compressed, urging the poppet member 112 forward as is described in more detail below.

Figure 6:
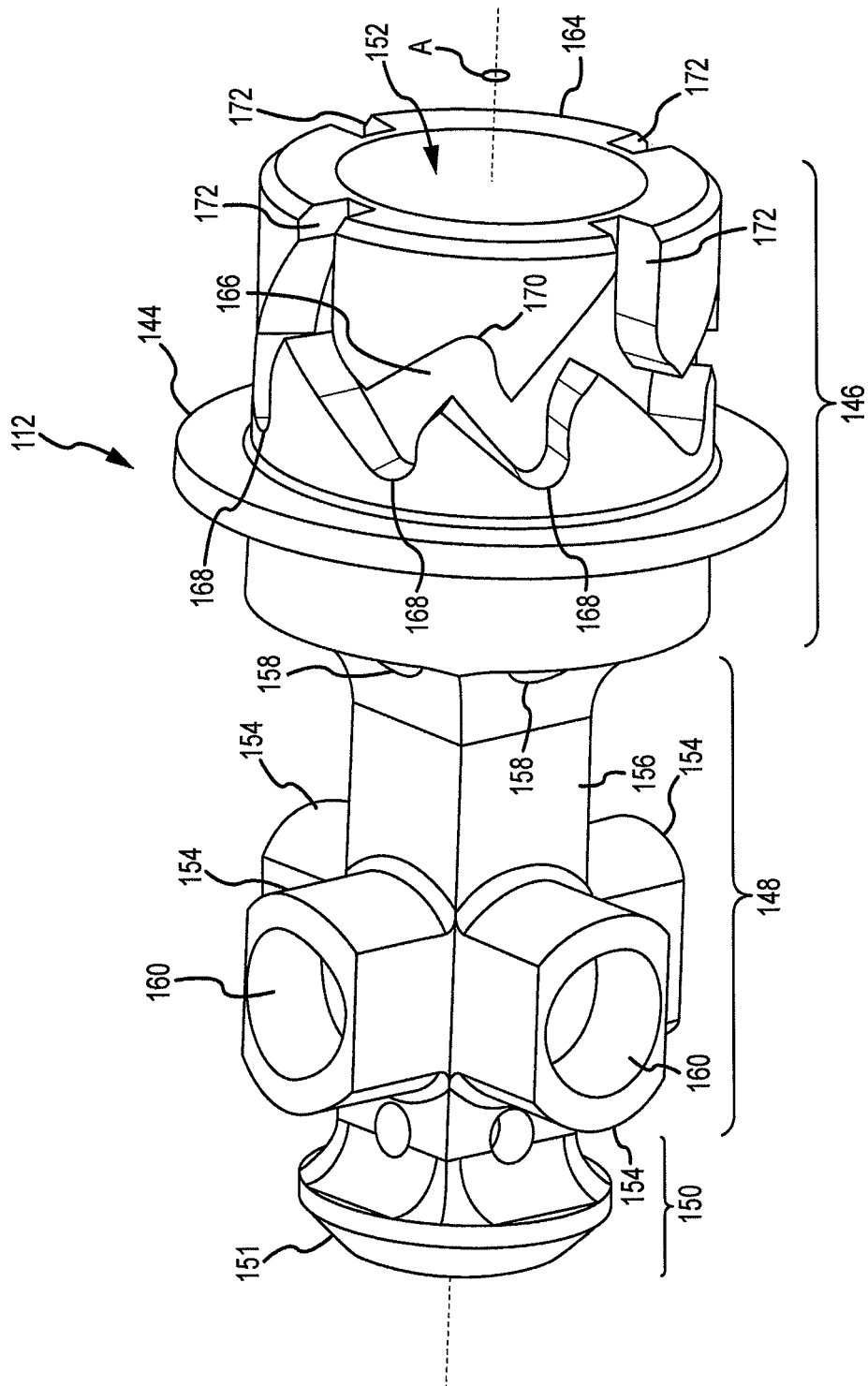
FIG. 6 is separate perspective view of the poppet shown in FIGS. 2-5, shown without the stopper balls in place, in accordance with the present disclosure.

The poppet member 112 is separately shown in FIG. 6. The poppet member 112 is a generally elongated body generally symmetrical about a central axis A. The poppet member 112 has an open tubular rear end portion 146, a spool portion 148 and a closed end valve disc portion 150. The disc 151 of the valve disc portion 150 selectively closes the central axial bore 134 through the outlet end 130 of the valve body 106. The poppet member 112 has an axial bore 152 extending through the rear portion 146 and part of the spool portion 148 of the poppet member 112. The spool portion 148 has one or more radial arms 154, preferably an even number, and in the illustrated exemplary embodiment, four radial arms 154, extending outward radially from a central stem 156 of the spool portion 148 to the inner wall of the mid portion 132 of the valve body 106. The spool portion 148 of the poppet member 112 also has several ports 158 leading forward from the bore 152 out of the rear portion 146. These ports 158 permit fluid flow through the bore 152 and around the arms 154 to and past the disc 151 of the closed end valve disc portion 150 of the poppet 112 and through the outlet 130 of the valve body 106 when the poppet 112 is in the second position.

Each of the radial arms 154 has a central passage 160 therethrough. Furthermore, each of the passages has a ball 162 disposed therein (shown in FIGS. 2 & 3). When the valve 100 is in the first position, shown in FIG. 3, the radial arms 154 are aligned with the passages 136. As fluid flows through the passages 160 into the passages 136, the balls 162 seat to close and block any further flow through passages 136. Fluid also flows through the axial bore 152 and through the ports 158, around the radial arms 154, and then to the outlet end 130 of the valve body 106 around the closed end valve disc portion 150. This configuration is shown in FIG. 3.

Turning back now to FIG. 6, and the separate view of the exemplary poppet 112, the open rear end portion 146 of the poppet 112 will be described. The end portion 146 has a tubular side wall 164 that has a zig-zag pattern annular cam groove 166 formed in the tubular wall 164. This cam groove 166 is sized complementary to the diameter and depth of the pins 116 and has forward notches or vertices 168 each rotationally spaced, for example, about 45° apart, or approximately ⅛ of a rotation, along the groove 166. The cam groove 166 also has rear notches 170 spaced alternatingly with four axial grooves 172 spaced, for example, about 90° apart. These axial grooves 172 merge with the cam groove 166 at an angular rotation position between the rear notches 170 in the groove 166.

Each of the four guide pins 116 ride in the cam groove 166 when the valve 100 is fully assembled. The sides of the cam groove 166 are angled toward the sequential forward and rear notches or vertices 168 and 170 of the groove 166 such that when the poppet moves forward and back as flow is applied or reduced, the poppet 112 has to rotate about 22.5° clockwise in this example, i.e., approximately ¹⁄₁₆ of a rotation, each time as it moves forward or back with each change in flow above and below the predetermined threshold rate. it is to be understood that the embodiment shown is merely exemplary. The precise rotational angles shown are approximate, and may differ from that shown depending on design configurations and tolerances.

When fluid flow is off, or at least reduced below the predetermined threshold, established by the spring rate of the spring 110, the poppet 112 moves rearward to one of the intermediate positions as is shown in FIG. 5. In this intermediate, or mid position, the radial arms 154 of the spool portion 148 are offset from alignment with the passages 136 rendering the passages 136 open to the bore 134 through the main valve body 106. Also, the disc portion 150 is spaced from the seat of the outlet end 130 of the valve body 106.

If the position of the poppet 112 before flow decrease had been as shown in FIG. 3, (flow through the outlet to the cleaning nozzle 104), then, when fluid flow is again turned on, the poppet 112 again is moved forward by the fluid flow against the inlet end portion 146, but this time moves the poppet 112 to the position shown in FIG. 4. This is the second position, in which the arms 154 are not aligned with the passages 136 through the mid portion of the valve body 106, and the disc 151 of the closed end valve disc portion 150 closes the outlet 130. Fluid flow thus is free to pass through the axial bore 152 in the rear end portion of poppet 112, through the passages 158 out of the stem 156 of spool portion 148, around the arms 154, and through the passages 136 to the external ports 138 and tractor nozzle jet tips 140.

When flow is subsequently reduced below the predetermined threshold, such as by the operator turning off flow, the poppet 112 rotates rearward to a position similar to that shown in FIG. 5, except rotated one notch 168 further by 45° than that shown. When flow is again restored, the poppet 112 continues to rotate, forward this time, to a position identical to that shown in FIG. 3.

It is to be understood that various changes can be made to the switching valve 100 in accordance with the present disclosure. For example, the valve body may be configured with 2, 3, 4, 5, or 6 radial passages 136, and the corresponding poppet would thus have an equal number of properly spaced radial arms 154. Furthermore, if sufficiently close tolerances are maintained, the need for balls 162 and passages 160 through the radial arms 154 may be eliminated. In such a configuration, the radial arms 154 would be solid and configured to substantially close off the passages 136 to the external traction ports 138.

Alternatively different sets of ports could be provided in the valve body 106 to provide additional flow paths as may be needed for a particular application. For example, rather than having only two separate flow paths, a configuration that has three flow paths could be designed without departing from the scope of the present disclosure. In such a configuration the zig-zag guide groove would have a different number of notches 168 and 170 as would be required for such a configuration. The passages 136 could alternatively lead to a separate nozzle assembly fastened to the valve rather than having integral tractor jet tips 140 mounted directly to the valve body 106. Furthermore, jet tool nozzle configuration and/or patterns can be selected to control speed or direction.

Fluid flow may alternatively be directed to other end components rather than nozzles. For example, in other applications of the valve 100 disclosed herein, the fluid flow could be directed not to nozzles, but to actuators which could perform functions such as centralizing, clamping, bending, crushing, expanding, or plugging. Thus the implementation to which the switching valve 100 is applied may be substantially modified.

Another embodiment of a switcher valve assembly in accordance with the present disclosure is a switcher valve cartridge 200 shown incorporated into a nozzle body 204 in an exemplary pipe cleaning assembly 202 described below with reference to FIGS. 7-22. The cartridge 200 may be incorporated into any number of nozzle configurations. Nozzle body 204 is merely exemplary of one such configuration.

Figure 7:
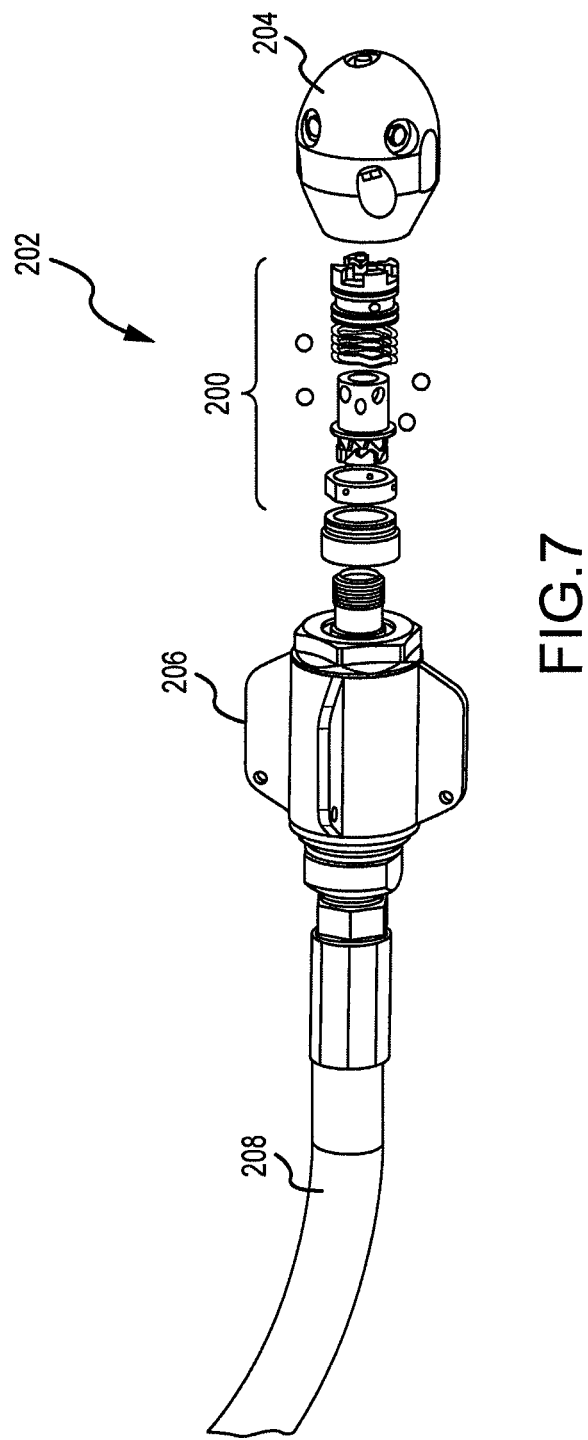
FIG. 7 is an exploded view of a switching nozzle head assembly in accordance with present disclosure.

An exploded view of a pipe cleaning assembly 202 is shown in FIG. 7. An enlarged exploded view of the cartridge 200 is shown in FIG. 8. The assembly 202 includes a nozzle head or nozzle body 204 that houses the cartridge 200. The nozzle head 204 is in turn threaded or otherwise fastened to a distal end of a rotating bearing coupling assembly 206 such as is disclosed in U.S. Pat. No. 6,059,202, which is, in turn, fastened to the distal end of a high pressure fluid hose 208.

The nozzle head, or body, 204 in this exemplary embodiment, is generally symmetrical about its longitudinal axis "A" and has a set of four arcuately spaced apart tractor ports 210, a set of four cleaning ports 212, and a front cleaning port 214. Each of these ports 210, 212, and 214 passes into a central blind bore 216, shown in FIGS. 9, 10 and 11, into which the cartridge 200 is installed. Each of these ports is positioned at an angle from, or displaced off center from the longitudinal axis A of the nozzle body 204 so as to impart a rotational moment to the nozzle body 204 during device operation. The angle from the axis causes forward traction, or neutral (no pulling), or retarding in the case of a forward cutting nozzle. It is only the radial offset that imparts a rotational moment to the nozzle body. As a result, during operation of the assembly 202, the nozzle body 204 spins on the bearing assembly 206. The bearing assembly 206 typically is designed to allow spinning at a controlled rate.

Figure 10:
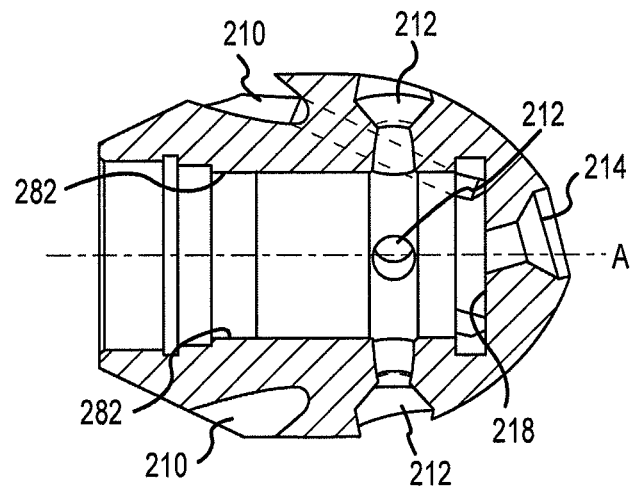
FIG. 10 is an axial cross sectional view through the nozzle head taken along the line 10-10 in FIG. 9.
Figure 11:
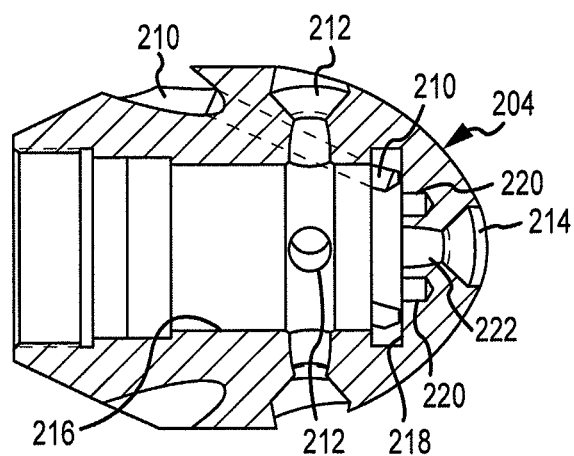
FIG. 11 is an axial cross sectional view through the nozzle head taken along the line 11-11 in FIG. 9.

Although not completely shown in FIGS. 9, 10 and 11, the ports 210 each extend through the body 204 (shown as dashed lines in FIGS. 10 and 11) to intersect the generally flat bottom 218 of the central bore 216. This bottom 218 has a pair of axially extending sockets 220 and a central hole 222 communicating with front port 214.

The choice of and direction of ports 210, 212, and 214 may be modified in different nozzle heads 204, depending on the particular cleaning application for which the nozzle 204 is designed. For example, the precise angular position, number and offset of each of the ports may be changed as well as the number of sets of ports depending on operational needs for a specific application. Provided the same radial spacing of the port openings into the central blind bore 216 remains the same, a variety of nozzle head configurations may utilize the same cartridge 200 as described below. Furthermore, all of the wear parts in the switching valve are contained in the cartridge 200 such that repair is simplified by simple cartridge replacement when required.

Referring back now to FIGS. 7 and 8, the cartridge 200 comprises a cartridge case 230, a tubular poppet 232, a biasing spring 234, a set of stopper balls 236 and a guide pin collar or ring 238. The cartridge 200 is assembled into the central blind bore 216 in the nozzle body 204 and captured therein via a threaded bushing 240. The threaded bushing 240 has a peripheral groove holding a seal O-ring 242. Similarly, the cartridge case 230 carries a pair of spaced O-rings 242 in corresponding peripheral grooves to seal the cartridge 200 in place in the bore 216.

Figure 12:
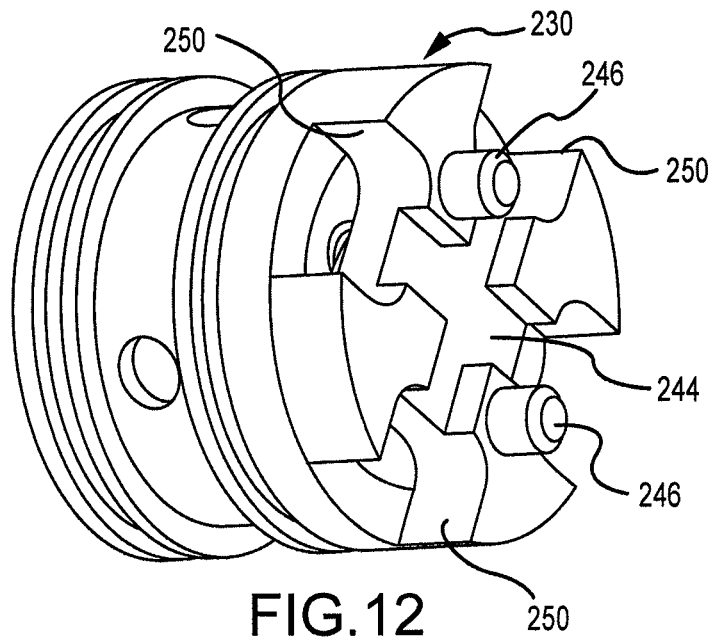
FIG. 12 is a separate perspective view of the cartridge shown in FIGS. 7 and 8 in accordance with the present disclosure.
Figure 13:
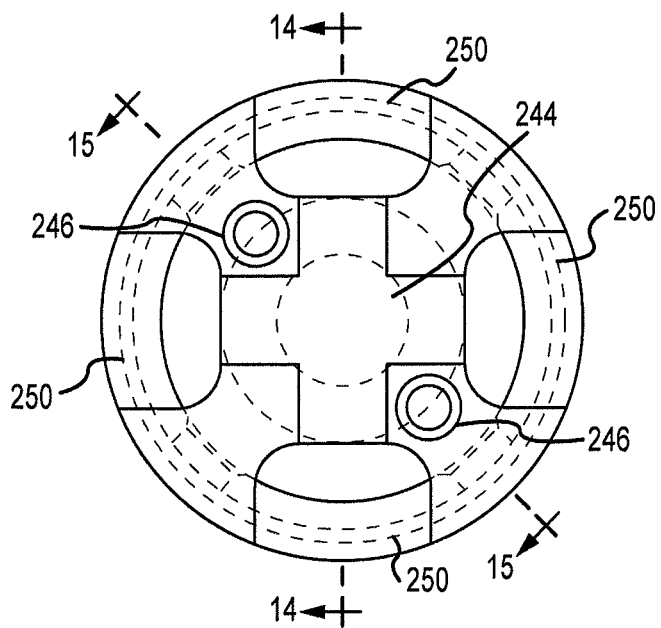
FIG. 13 is a front end view of the cartridge shown in FIG. 12.
Figure 14:
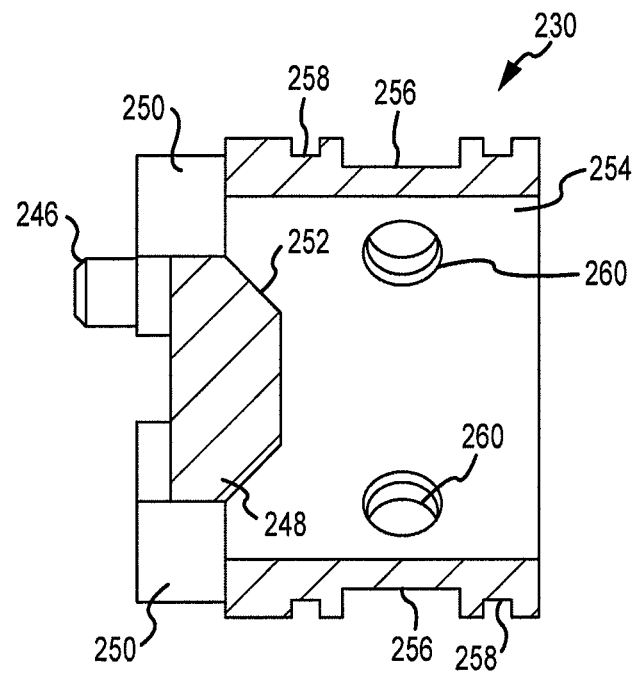
FIG. 14 is an axial longitudinal sectional view of the cartridge shown in FIG. 12 taken along the line 14-14 in FIG. 13.
Figure 15:
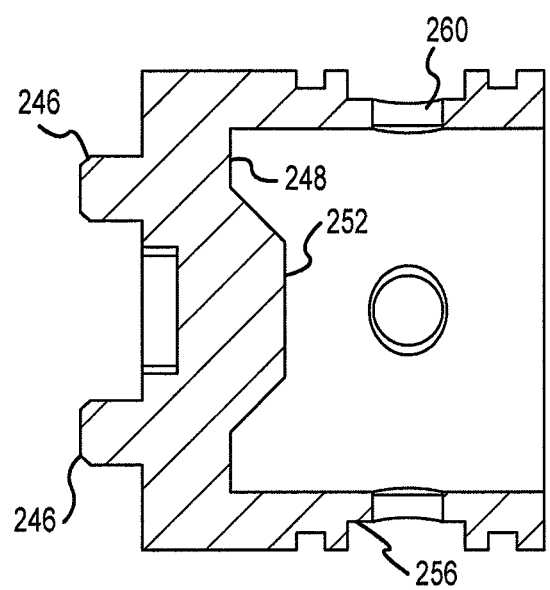
FIG. 15 is an axial longitudinal sectional view of the cartridge shown in FIG. 12 taken along the line 15-15 in FIG. 13.
Figure 20:
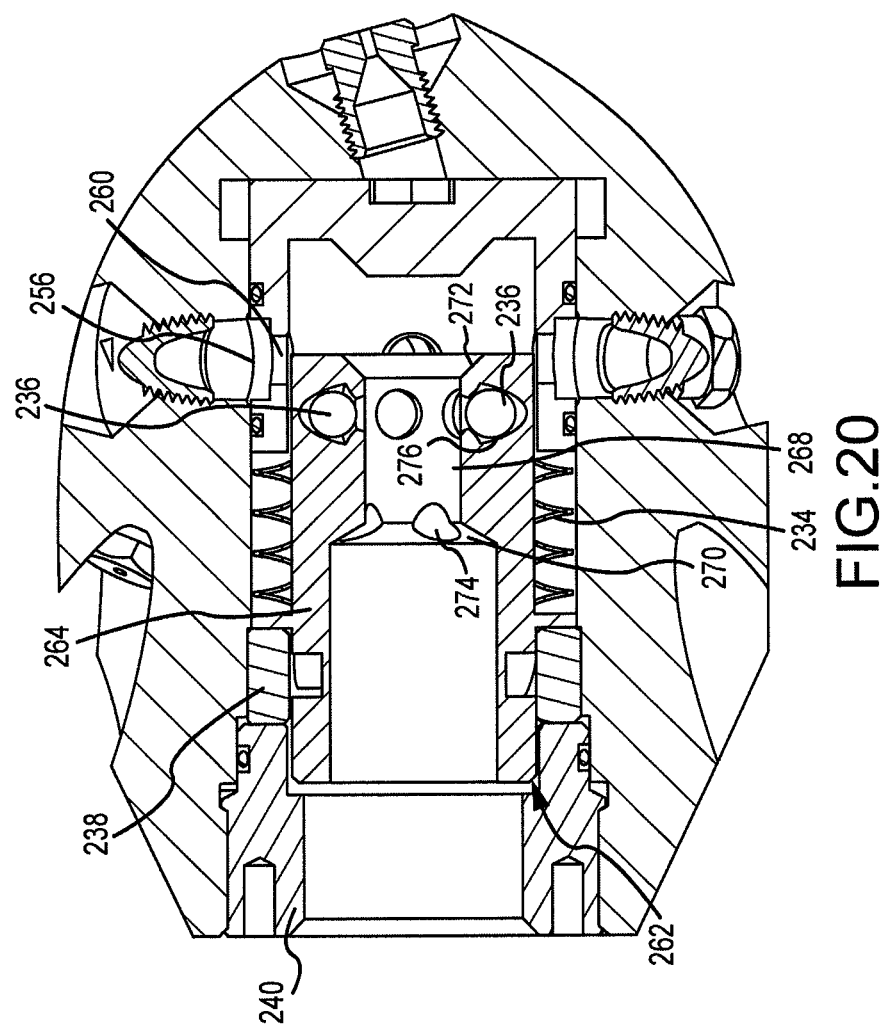
FIG. 20 is an axial cross sectional view of the complete nozzle assembly shown in FIG. 8 in accordance with the present disclosure when fluid pressure is initially off.

The cartridge case 230 is shown in separate perspective view in FIG. 12. An outside bottom end view of case 230 is shown in FIG. 13. FIGS. 14 and 15 are longitudinal sectional views through the case 230. FIG. 20 is a longitudinal sectional view through the assembled cartridge 200 in nozzle body 204 when fluid flow is either off or at least below a predetermined fluid flow/pressure threshold.

Cartridge case 230 is a generally tubular cup, preferably made of a hardened stainless steel material, with a cross or X shaped exterior channel 244 formed in the bottom 248 of the cup between and separating a pair of spaced, axially extending, locating pins 246. At the end of each leg of the cross channel 244 is a corner recess 250 that passes into the interior of the cartridge case 230 through the bottom 248. The bottom 248 has a central circular raised portion that forms a valve disk 252.

The tubular side wall 254 of the case 230 has a wide peripheral channel 256 spaced between two narrow grooves 258 for receiving the O-rings 242. The side wall 254 in the bottom of the peripheral channel 256 has a set of four spaced radial openings 260, spaced 90° apart, that extend through the side wall 254. When the cartridge case 230 is fully seated in the blind bore 216 in the nozzle head 204, the locating pins 246 fit within the sockets 220. This ensures that openings 260 are aligned with the ports 212 as is shown, for example, in FIG. 20.

Furthermore, when the cartridge case 230 is fully inserted into the bore 216 and pins 246 engaged in the sockets 220, four passages from the case interior to the bottom 218 of the blind bore 216 are formed between the case 230 interior and the cross shaped channel 244 via corner recesses 250. As can partially be seen in FIGS. 10 and 11, these passages intersect with the bottom inner ends of the bores forming each of traction ports 210.

Figure 16:
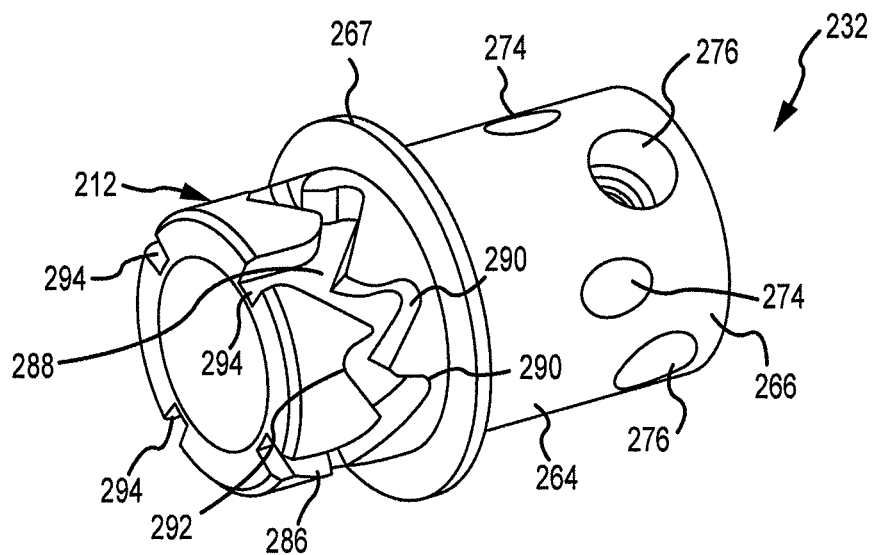
FIG. 16 is a separate perspective view of the valve poppet shown in FIGS. 7 and 8.
Figure 17:
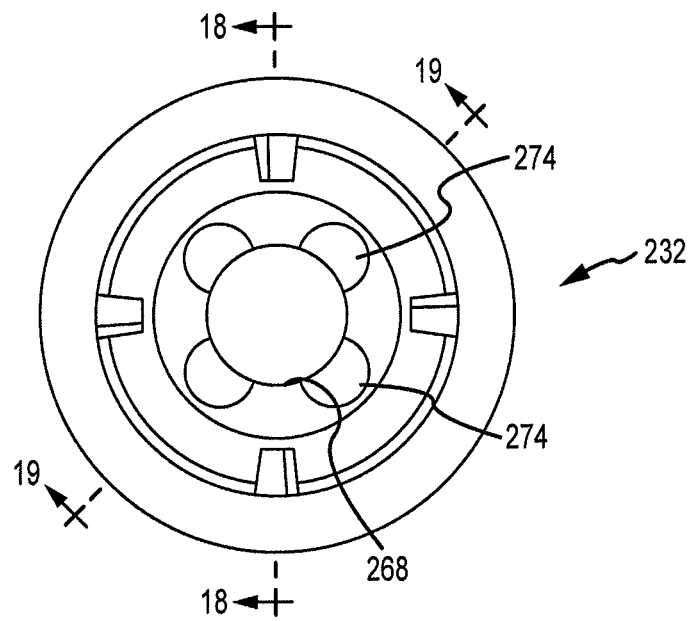
FIG. 17 is a rear end view of the valve poppet shown in FIG. 16.
Figure 18:
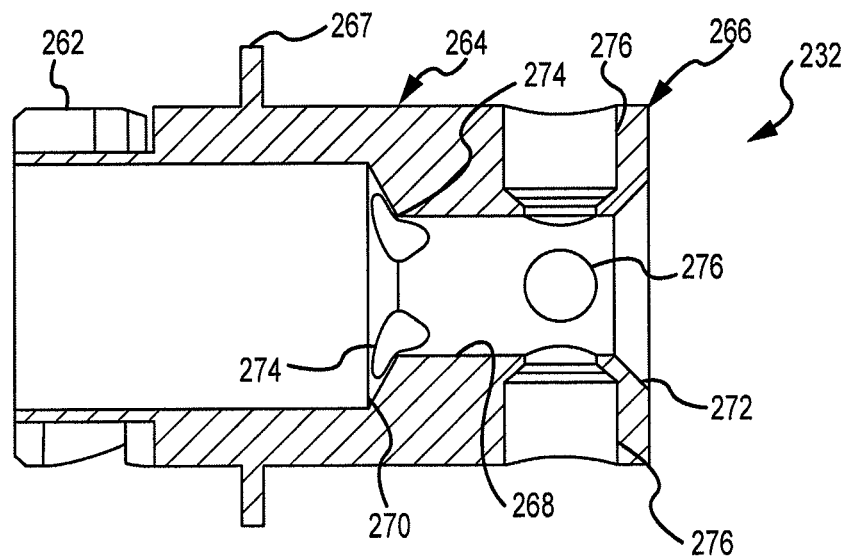
FIG. 18 is an axial cross sectional view of the valve poppet shown in FIG. 16 taken along the line 18-18 in FIG. 17.
Figure 19:
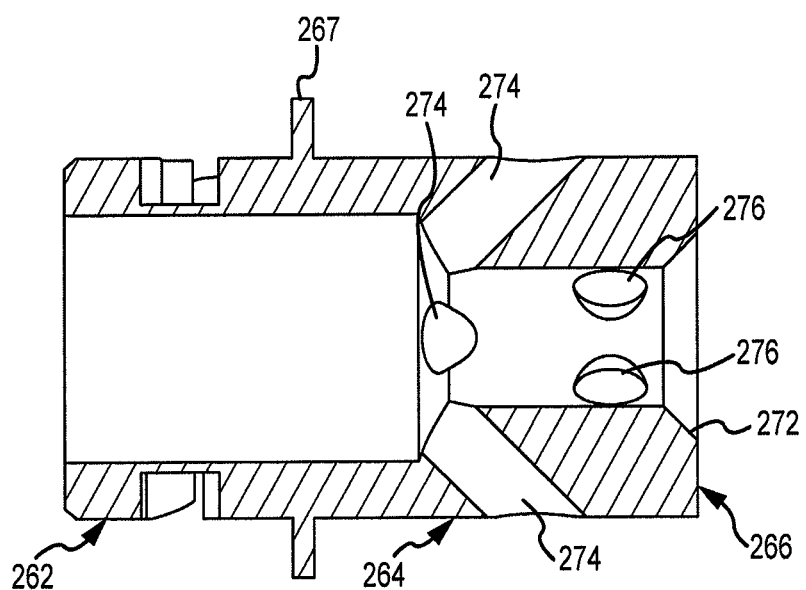
FIG. 19 is an axial cross sectional view of the valve poppet shown in FIG. 16 taken along the line 19-19 in FIG. 17.
Figure 21:
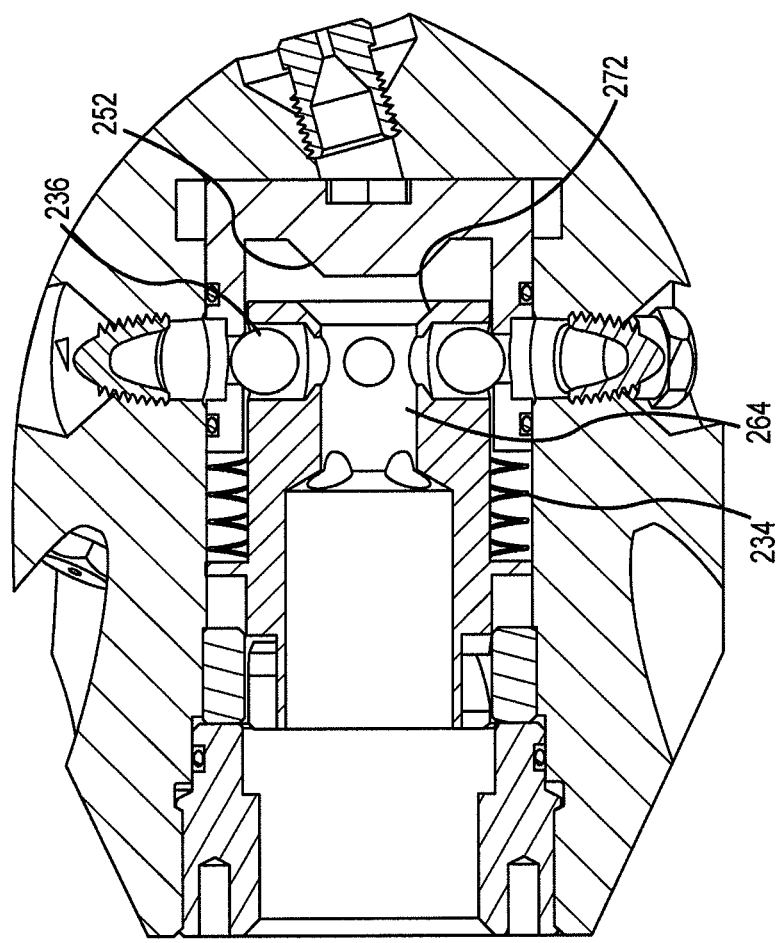

The poppet 232 is separately shown in a rear perspective view in FIG. 16. A normal rear end view of the poppet 232 is shown in FIG. 17. Different longitudinal sectional views of the poppet 232 are shown in FIGS. 18 and 19. Poppet 232 is basically a tubular body with a rear portion 262, a central portion 264 and a front end portion 266. The rear portion is separated from the central portion 264 by an exterior peripheral annular flange 267. This annular flange 267 engages one end of the biasing spring 234 as is shown in FIGS. 20-22.

The tubular poppet 232 internally tapers and thickens in the central portion 264 to form at a shoulder 270 in the central portion 264 a small central axial passage 268 through the central portion. The small central passage 268 continues through the front end portion 266 and ends at an annular valve seat 272. The central portion 264 has a set of four angled passages 274 spaced equally apart and extending outward from the shoulder 270 through the central portion 264 to and through the exterior surface of the central portion 264. The central portion 264 also has a set of four radial passages 276 equally spaced around the central portion 264 and angularly positioned 45° apart from the passages 274. Each of the radial passages 276 receives and holds one of the balls 236 therein.

The guide pin ring or collar 238 in this embodiment is similar to the guide collar 146 described above with reference to the first embodiment 100 except that guide collar 238 is a tubular sleeve that has a pair of exterior alignment flats 280 which mate with corresponding flats 282 in the central bore in the nozzle head 204. These alignment flats 280 and 282 can be seen in FIGS. 8 and 9. The engaged flats 280 and 282 prevent rotation of the collar 238 when assembled in the nozzle body 204. Furthermore, these flats ensure proper alignment of the collar 238 with the cartridge case 230. The guide collar 238 also has four radial bores therethrough each receiving a guide pin 284 press fit therein. When the guide collar 238 is assembled into the nozzle body 204, a portion of each of the guide pins 284 projects radially inward toward the axial centerline of the nozzle body 204.

Turning now to FIG. 16, and the separate view of the exemplary poppet 232, the open rear end portion 262 of the poppet 232 will be described. The end portion 262 has a tubular side wall 286 that has a zig-zag pattern annular cam groove 288 formed in the tubular wall 286. This cam groove 288 is sized complementary to the diameter and depth of the pins 284 that project radially inward from the guide collar 232. When the cartridge 200 is fully assembled, the pins 284 ride in the cam groove 288. This cam groove 288 has forward notches or vertices 290 each rotationally spaced about 45° apart along the groove 288. The cam groove 288 also has rear notches 292 spaced alternatingly with four axial grooves 294 spaced about 90° apart. These axial grooves 294 merge with the cam groove 288 at an angular rotation position between the rear notches 292 in the groove 288.

Each of the four guide pins 284 ride in the cam groove 288 when the valve cartridge 200 is fully assembled. The sides of the cam groove 288 are angled toward the sequential forward and rear notches or vertices 290 and 292 of the groove 288 such that when the poppet 232 moves forward and back as flow is applied or reduced, the poppet 232 has to rotate about 22.5° clockwise each time as it moves forward or back with each change in flow above and below the predetermined threshold rate.

When fluid flow is off, or at least reduced below the predetermined threshold, established by the spring rate of the spring 234, the poppet 232 moves rearward to one of the intermediate positions as is shown in FIG. 20. Although the guide pins 284 are not visible in FIG. 20, they are in the same position, resting against the forward notches 290 as is shown for the first embodiment in FIG. 5.

In this intermediate position, the flange 267 rests against the collar guide 238. In this position, passages 274 are blocked as are openings 276. The central bore through the poppet 232 is open to all the passages, i.e. the bottom passages through openings 250 to the tractor nozzle ports 210 and the ports 212. However, fluid pressure is either off or low at this point.

If the position of the poppet 232 before flow decrease had been as shown in FIG. 22, i.e., flow through the passages 274 outlet to the cleaning nozzle ports 212, then, when fluid flow is again turned on, the poppet 232 again is moved forward by the fluid flow against the inlet end portion 262, but this time moves the poppet 232 forward only to the position shown in FIG. 21. In this position, the passages 274 are not aligned with the cleaning ports 212 through the mid portion of the nozzle head 204, and the disc 252 of cartridge case 230 is spaced from the seat 272 of the poppet 232. Fluid flow thus is free to pass directly through the poppet 232, out the openings 250 in the bottom of the cartridge case 230 to the traction ports 210, as well as along the channel 244 to the front port 214. At the same time, the openings 276 are directly aligned with the cleaning ports 212. However, the balls 236 carried in each of the openings 276 are forced outward by fluid pressure so as to plug the ports 212. Thus when poppet is in the position shown in FIG. 21, full fluid flow is permitted to the front port 214 and the traction ports 210 while flow is positively prevented through cleaning ports 212.

When flow is subsequently reduced below the predetermined threshold, such as by the operator turning off flow, the poppet 232 rotates about 22.5° as the spring 234 pushes the poppet 232 rearward to engage stationary guide pins 284 to cause rotation and axial movement to an intermediate position similar to that shown in FIG. 20, except rotated one notch 290 further by 22.5°. This rotation is caused by the interaction between the stationary guide pins 284 riding in the groove 288 forcing rotation of the poppet 232 as the spring 234 pushes the poppet rearward, in a similar manner as described above with reference to poppet 112 in the description of the first embodiment 100.

Then, when flow is increased above the predetermined threshold, the poppet 232 rotates about 22.5° again as fluid flow pushes the poppet 232 forward, to the position shown in FIG. 22. When the poppet 232 is in this position, the openings 276 are misaligned with the ports 212, the valve disk 252 plugs the seat 272 of the poppet 232, and the passages 274 are directly aligned with the cleaning ports 212. Since the outlet end of the poppet 232 is closed off, there is no flow available to the traction ports 210. Thus, while flow is directed through the cleaning ports 212, flow is positively prevented through the traction ports 210. Each cycle of fluid flow/pressure application causes about a 45° rotation of the poppet 232 and hence an alternation between fluid flow being directed to traction ports 210 and cleaning ports 212. Since all of these ports are preferably offset from a direct radial orientation, a rotational torque is applied to the nozzle to cause nozzle head rotation. Finally, each of the ports 210 and 212 preferably has a threaded jet tip 298 installed. These jet tips 298 may also be of different configurations depending on the task to be performed.

It is to be understood that various changes can be made to the nozzle 204 and to the switching valve cartridge 200 in accordance with the present disclosure. For example, the nozzle head body 204 may be configured with a different number of ports 210 and 212 and the corresponding poppet 232 and case 230 in the cartridge 200 would thus have a different number of openings and passages. The same cartridge 200 may be utilized in a variety of nozzle head bodies 204 each with a different set of angled ports. The angles and offsets utilized may be tuned to achieve specific rotational torques at designed pressures and flow rates. Furthermore, if sufficiently close tolerances are maintained, the need for balls 236 could be eliminated.

Alternatively different sets of ports could be provided in the nozzle body 204 to provide additional flow paths as may be needed for a particular application. For example, rather than having only two separate flow paths, a configuration that has three flow paths could be designed without departing from the scope of the present disclosure. In such a configuration the zig-zag cam groove 288 would have a different number of notches 290 and 292 as would be required for such a configuration. In both of the embodiments 100 and 200 shown, the grooves 166 and 288 are shown as being rectangular channels. Other configurations could also be used, depending on the types and number of guide pins in the guide pin collar used.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A nozzle comprising:
   a hollow body having a central bore, one or more first ports, and one or more second ports, wherein each first and second port extends through the body from the central bore; and
   a switching valve cartridge including a poppet and a guide disposed in the central bore, wherein the poppet and guide cooperate to direct fluid flow from an inlet to the central bore to the one or more first ports upon application of fluid flow above a predetermined threshold to the inlet to the central bore and, if fluid flow drops below a predetermined threshold, direct fluid flow from the inlet to the central bore to the one or more second ports when fluid flow is next applied above the predetermined threshold.

2. The nozzle according to claim 1 wherein the poppet is located at a first position when fluid flow is directed through the one or more first ports and at a second position when fluid flow is directed through the one or more second ports.

3. The nozzle according to claim 2 wherein the poppet is at a third position whenever fluid flow drops below the predetermined threshold.

4. The nozzle according to claim 2 wherein the poppet at the first position directs fluid flow through a first set of the first ports and directs fluid flow through a second set of the second ports at the second position.

5. The nozzle according to claim 4 wherein each transition below the predetermined threshold causes the fluid flow to alternate between the first and second sets of ports.

6. A nozzle comprising:
   a hollow body connectable to a high pressure fluid supply, the body having a central bore, a first plurality of ports extending out of the body from the central bore and a second plurality of ports extending out of the body from the central bore; and
   a switching valve cartridge assembly including a poppet and guide disposed in the central bore operable to direct fluid flow from an inlet to the central bore to one or more of the first plurality of ports upon application of fluid flow above a predetermined threshold to the inlet to the central bore and direct fluid flow from the inlet to the central bore to one or more of the second plurality of ports upon fluid flow through the inlet dropping below the predetermined threshold and then exceeding the predetermined threshold.

7. A nozzle comprising:
   a hollow body connectable to a high pressure fluid supply, the body having a central bore, a first plurality of ports extending out of the body from the central bore and a second plurality of ports extending out of the body from the central bore; and a switching valve cartridge assembly disposed in the central bore operable to direct fluid flow from an inlet to one or more of the first plurality of ports upon application of fluid flow above a predetermined threshold to the inlet and direct fluid flow from the inlet to one or more of the second plurality of ports upon fluid flow dropping below the predetermined threshold and then exceeding the predetermined threshold, wherein the cartridge assembly comprises:

a generally tubular valve cartridge case disposed in the central bore of the hollow body, the case having an inlet end, an outlet end, a mid portion, and a central axial bore through the inlet end and at least the mid portion, the mid portion having at least one first opening leading from the central axial bore out through the mid portion of the cartridge case, and the outlet end having at least one second opening leading from the central axial bore out through the end portion of the cartridge case;

a generally tubular valve poppet having a central passage therethrough, the poppet being movably disposed in the central axial bore of the cartridge case, the poppet having an open tubular rear end portion, a central portion and a front end portion, the central portion of the poppet having an external peripheral annular flange between the rear end portion and the central portion, the central portion having at least a first passage leading out of the poppet and at least a second passage spaced from the first passage leading out of the poppet;

a biasing member between the valve cartridge case and the flange around the central portion, the poppet member biasing the poppet member axially away from the inlet end of the cartridge case; and a guide member positioned around the tubular rear end portion of the poppet and fastened to the hollow nozzle housing at a fixed distance from the cartridge case, the guide member engaging a corresponding feature on the rear end portion of the poppet to align the first passage of the central portion of the poppet with the at least one opening of the cartridge at a first position of the poppet when fluid flow is introduced into the rear end of the poppet, misalign the first passage with the at least one opening when fluid flow is reduced below a predetermined flow rate threshold, and align the second passage of the central portion of the poppet with the other opening in the valve cartridge case when fluid flow is next introduced in the inlet end of the poppet above the flow rate threshold.

8. The nozzle according to claim 7 wherein the outlet end of the poppet engages a complementary seat in the outlet end of the cartridge closing the central axial passage when the poppet member is in the second position.

9. The nozzle according to claim 8 wherein when fluid flow is again reduced below the predetermined threshold the valve disc of the poppet member disengages the valve seat and opens the central passage through the outlet portion of the poppet.

10. The nozzle according to claim 9 wherein when fluid flow is again increased above the predetermined threshold the guide causes the poppet to again return to the first position.

11. The nozzle according to claim 7 wherein the guide member and bias member cooperate to position the poppet at a common axial position whenever fluid flow decreases below the predetermined threshold.

12. A switching valve cartridge comprising:

a generally tubular valve cartridge case having an inlet end, an outlet end, a mid portion, and a central axial bore through the inlet end and at least the mid portion, the mid portion having at least one first opening leading from the central axial bore out through the mid portion of the cartridge case, and the outlet end having at least one second opening leading from the central axial bore out through the end portion of the cartridge case;

a generally tubular valve poppet having a central passage therethrough, the poppet being movably disposed in the central axial bore of the cartridge case, the poppet having an open tubular rear end portion, a central portion and a front end portion, the central portion of the poppet having an external peripheral annular flange between the rear end portion and the central portion, the central portion having at least a first passage leading out of the poppet and at least a second passage spaced from the first passage leading out of the poppet;

a biasing member between the valve cartridge case and the flange around the central portion, the poppet member biasing the poppet member axially away from the inlet end of the cartridge case; and a guide member positioned around the tubular rear end portion of the poppet at a fixed distance from the cartridge case, the guide member engaging a corresponding feature on the rear end portion of the poppet to align the first passage of the central portion of the poppet with the at least one opening of the cartridge at a first position of the poppet when fluid flow is introduced into the rear end of the poppet, misalign the first passage with the at least one opening when fluid flow is reduced below a predetermined flow rate threshold, and align the second passage of the central portion of the poppet with the other opening in the valve cartridge case when fluid flow is next introduced in the inlet end of the poppet above the flow rate threshold.

13. The cartridge assembly according to claim 12 wherein the outlet end of the poppet engages a complementary seat in the outlet end of the cartridge closing the central axial passage when the poppet member is in the second position.

14. The cartridge assembly according to claim 13 wherein when fluid flow is again reduced below the predetermined threshold the valve disc of the poppet member disengages the valve seat and opens the central passage through the outlet portion of the poppet.

15. The cartridge assembly according to claim 14 wherein when fluid flow is again increased above the predetermined threshold the guide causes the poppet to again return to the first position.

16. The cartridge assembly according to claim 12 wherein the guide member and bias member cooperate to position the poppet at a common axial position whenever fluid flow decreases below the predetermined threshold.

17. The cartridge assembly according to claim 16 further comprising a ball disposed in the at least one second passage for sealing the second opening through the cartridge case when the poppet is in the first position.

18. The cartridge assembly according to claim 12 wherein the cartridge case has four first openings and four second openings.

19. The cartridge assembly according to claim 18 wherein the poppet has four first passages and four second passages.

20. The cartridge assembly according to claim 19 further comprising four balls, one in each of the second passages.

* * * * *

UNITED STATES PATENT AND TRADEMARK OFFICE
CERTIFICATE OF CORRECTION

PATENT NO. : 8,863,775 B2  
APPLICATION NO. : 13/367080  
DATED : October 21, 2014  
INVENTOR(S) : Zink et al.

Page 1 of 1

It is certified that error appears in the above-identified patent and that said Letters Patent is hereby corrected as shown below:

On the Title Page, Item (73), under "Assignee", in Column 1, Line 1, delete "Stonage," and insert -- Stoneage, --, therefor.

Signed and Sealed this  
Twenty-ninth Day of September, 2015

Michelle K. Lee  
*Director of the United States Patent and Trademark Office*